United States Patent
Fu et al.

(10) Patent No.: US 9,535,631 B2
(45) Date of Patent: Jan. 3, 2017

(54) MULTI-PATH MANAGEMENT

(71) Applicant: International Business Machines Corporation, Armonk, NY (US)

(72) Inventors: Xiaofei Fu, Shanghai (CN); Jiale Hu, Shanghai (CN); Peng Shi, Shanghai (CN); Zhihua Yu, Hangzhou (CN); Yaodong Zhang, Shanghai (CN)

(73) Assignee: GLOBALFOUNDRIES INC., Grand Cayman (KY)

( * ) Notice: Subject to any disclaimer, the term of this patent is extended or adjusted under 35 U.S.C. 154(b) by 87 days.

(21) Appl. No.: 14/468,544

(22) Filed: Aug. 26, 2014

(65) Prior Publication Data

US 2015/0058558 A1 Feb. 26, 2015

(30) Foreign Application Priority Data

Aug. 26, 2013 (CN) .......................... 2013 1 0375639

(51) Int. Cl.
*G06F 3/06* (2006.01)
(52) U.S. Cl.
CPC ............ *G06F 3/0689* (2013.01); *G06F 3/061* (2013.01); *G06F 3/067* (2013.01); *G06F 3/0635* (2013.01)
(58) Field of Classification Search
CPC .... G06F 3/0665; G06F 3/0683; G06F 3/0689; G06F 13/22; G06F 13/4022; G06F 13/426; G06F 2213/0008; G06F 3/0619; G06F 3/0622; G06F 3/061; G06F 3/067; G06F 3/0635; H04L 45/00; H04L 49/357; H04L 41/0654; H04L 45/302
See application file for complete search history.

(56) References Cited

U.S. PATENT DOCUMENTS

| | | | | |
|---|---|---|---|---|
| 7,228,538 | B1* | 6/2007 | Burton | ...................... G06F 8/67 717/170 |
| 7,318,138 | B1* | 1/2008 | Usgaonkar | .......... G06F 11/2092 711/163 |
| 7,839,788 | B2 | 11/2010 | Qi | |
| 8,024,309 | B1 | 9/2011 | Deshmukh et al. | |
| 8,423,665 | B2 | 4/2013 | Takeuchi et al. | |

(Continued)

FOREIGN PATENT DOCUMENTS

GB 2490591 A 11/2012

OTHER PUBLICATIONS

EMC, "EMC CLARiiON Integration with VMware ESX," EMC White Paper, Feb. 2011, p. 1-62, Applied Technology, EMC Corporation.

(Continued)

*Primary Examiner* — Hashem Farrokh
(74) *Attorney, Agent, or Firm* — Yuanmin Cai; Andrew M. Calderon; Roberts Mlotkowski Safran Cole & Calderon, P.C.

(57) ABSTRACT

The invention discloses a multi-path management method and system for managing paths over which an IO is routed from a host to multiple logical volumes (LUNs) of a storage system, wherein the multiple LUNs of the storage system are mapped to the host, and the method comprises: grouping LUNs with the same paths between the host and the storage system into a group of LUNs; and using one path selection thread for all of LUNs in the group of LUNs to manage the same paths. The method and system lower the amount of work for path management and the amount of required resources.

15 Claims, 7 Drawing Sheets

(56) References Cited

U.S. PATENT DOCUMENTS

| | | | | |
|---|---|---|---|---|
| 8,583,861 | B1* | 11/2013 | Ofer | G06F 3/0617 |
| | | | | 709/242 |
| 2003/0005119 | A1* | 1/2003 | Mercier | G06F 3/0601 |
| | | | | 709/225 |
| 2008/0250042 | A1* | 10/2008 | Mopur | G06F 11/008 |
| 2009/0228748 | A1* | 9/2009 | Hagerott | G06F 11/2215 |
| | | | | 714/718 |
| 2012/0233494 | A1 | 9/2012 | Sandstrom et al. | |

OTHER PUBLICATIONS

Fu et al, "Multi-Path Management," Filed on Aug. 26, 2013, p. 1-26, CN Patent Application No. 201310375639.3.

Taneja Group, "EMC POWERPATH/VE Enhancing resiliency, performance, and management in the virtual data center," Technology Profile, Mar. 2013, p. 1-7.

VMWARE, "vSphere Storage," 2012, p. 1-272, ESXi 5.1, vCenter Server 5.1, EN-000809-02.

* cited by examiner

MULTI-PATH MANAGEMENT

CROSS-REFERENCE TO RELATED APPLICATIONS

This application claims the benefit of priority from Chinese Patent Application Number 201310375639.3, filed Aug. 26, 2013, which is hereby incorporated by reference in its entirety.

BACKGROUND

The present invention relates to a storage system and particularly to a multi-path management method and system.

A storage system includes RAID arrays, a RAID controller, an adapter and a storage management server. The storage management server is connected with the other devices over a network to manage the operation of the entire storage system. FIG. 1 illustrates a structural block diagram of the storage system. A Redundant Array of Independent (or Inexpensive) Disks (RAID) array is a large-capacity disks group composed of a large number of inexpensive disks to improve the efficiency of the entire disk system due to an additive effect arising from provision of data by the individual disks. The storage system creates a variety of RAID arrays internally through the RAID controller. The storage system further creates logical volumes in the RAID arrays, also referred to as Logical Unit Numbers (LUNs), which are in turn mapped to hosts, and the hosts will use the LUNs as local hard disks.

The hosts communicate with the storage system through Fiber Channel (FC) switches. The host side is connected with the fiber channel switches by Host Bus Adapters (HBAs), referred to as a host bus adapter at the host side and also referred to as a Fiber Channel interface card or an FC adapter at the switch side. The storage system side is also connected with the fiber channel switches by fiber channel interface cards or fiber channel adapters.

FIG. 2 illustrates connection relationships between the hosts, the fiber channel switches and the storage system. In FIG. 2, host 1 can access the LUNs on the storage system over 4 paths, that is, from HBA1 port of host 1 to fiber channel adapter port 1 of the storage system, from HBA1 port of host 1 to fiber channel adapter port 2 of the storage system, from HBA2 port of host 1 to fiber channel adapter port 1 of the storage system, and from HBA2 port of host 1 to fiber channel adapter port 2 of the storage system. Moreover, host 2 can access the LUNs on the storage system over 4 paths.

A host reaches the storage system over multiple paths, and multi-path software can be installed on the host to manage the multiple paths between the host and the storage system. The multi-path software can balance an Input and Output (IO) of each path; obviate a failed path in routing an IO upon detection of the failed path; resume communication between the host and an LUN of the storage system over the original path when the failure of the path is removed; and so on. Path selection algorithms adopted by the multi-path software include:

Failover: only one path is selected to route an IO, and another path will be selected to route the IO only if that path fails;

Round Robin: an IO is routed alternately over multiple paths; and

Load Balance: a path on a lightly loaded HBA is selected to route an IO; and a path will be selected randomly if there are equally loaded HBAs.

When a large number of LUNs of the storage system are mapped to a host, for example, the host has 1,000 or more LUNs mapped thereto and can access the storage system over 6 or more paths, then the multi-path software will manage 6,000 or more paths; moreover the host also has to start 1,000 multi-path selection processes responsible for path selection on the 1,000 LUNs respectively. The multi-path software will consume a large amount of host resources (including CPU and memory) for management of these paths, thus degrading the efficiency of the host greatly. Thus, the existing multi-path software does not recommend a large number of paths configured for each LUN.

SUMMARY

In order to address the foregoing problems, an object of the invention is to lower the amount of work for path management and the amount of resources required.

According to an aspect of the present invention, there is provided a multi-path management method of managing paths over which an IO is routed from a host to multiple Logical volumes (LUNs) of a storage system, wherein the multiple LUNs of the storage system are mapped to the host, and the method includes: grouping LUNs with the same paths between the host and the storage system into a group of LUNs; and using one path selection thread for all of LUNs in the group of LUNs to manage the same paths.

According to another aspect of the present invention, there is provided a multi-path management system for managing paths over which an IO is routed from a host to multiple Logical volumes (LUNs) of a storage system, wherein the multiple LUNs of the storage system are mapped to the host, and the system includes: a grouping device configured to group LUNs with the same paths between the host and the storage system into a group of LUNs; and a path selecting device configured to manage the same paths by using one path selection thread for all of LUNs in the group of LUNs.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
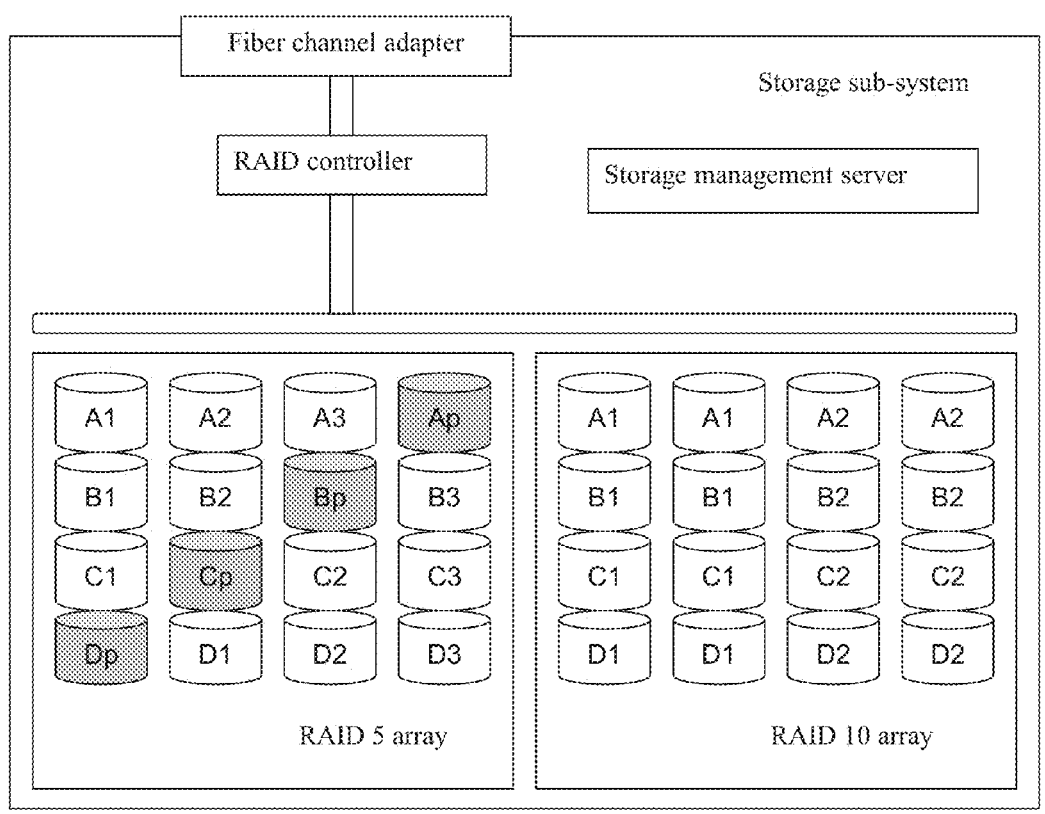
FIG. 1 shows a structural block diagram of the storage system.
Figure 2:
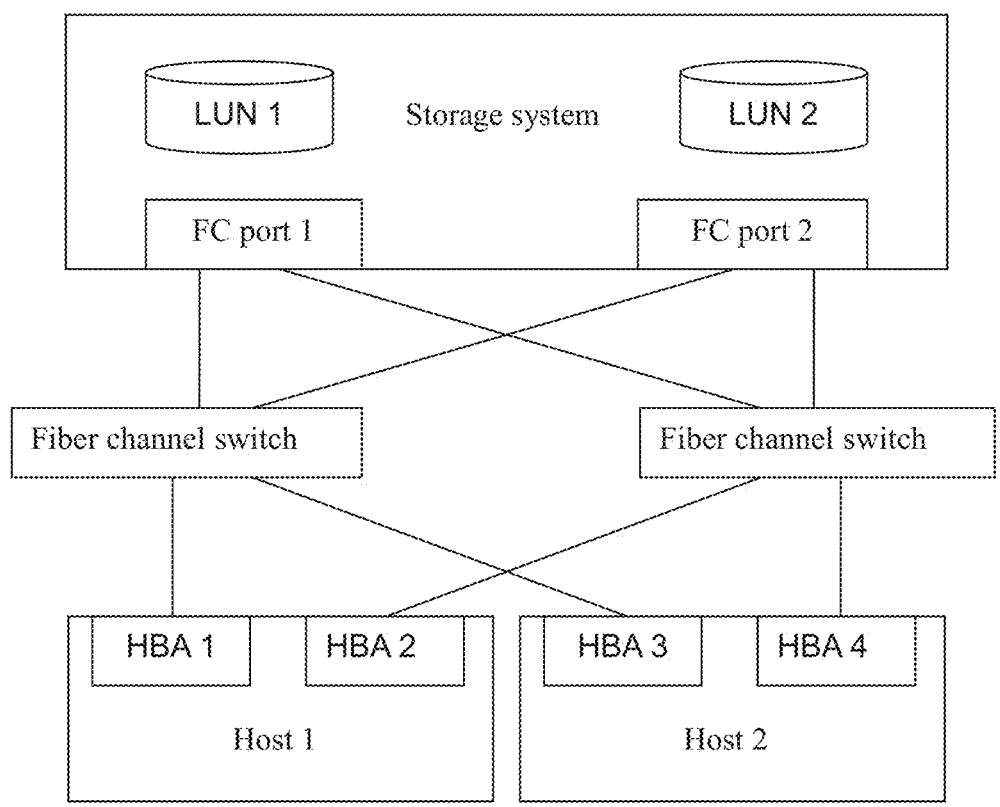
FIG. 2 illustrates connection relationships between the hosts, the fiber channel switches and the storage system.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
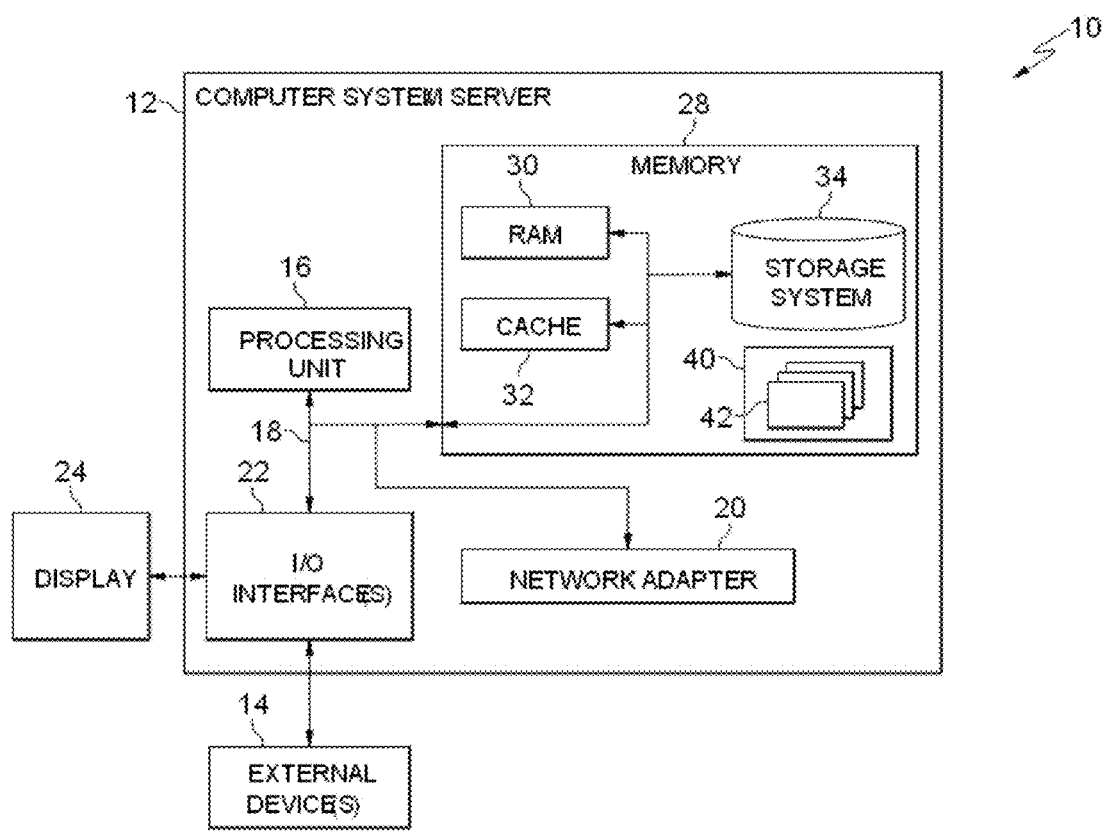
FIG. 3 illustrates an exemplary computer system/server which is applicable to implement the embodiments of the present invention

Referring now to FIG. 3, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 3, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Embodiments of the invention will be described below with reference to the drawings.

Figure 4:
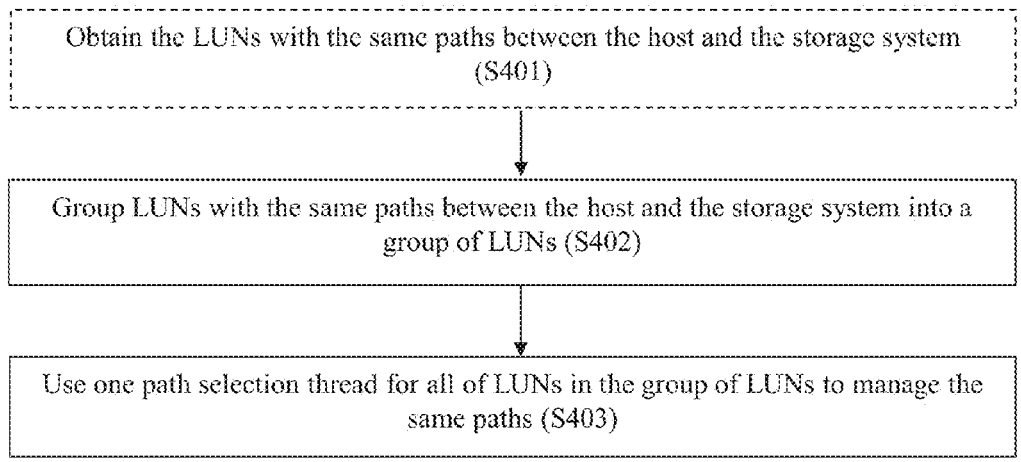
FIG. 4 illustrates schematically a flow chart of a multi-path management method.

In an embodiment of this disclosure, there is proposed a multi-path management method of managing paths when an IO is routed from a host to a storage system, wherein multiple LUNs of the storage system are mapped to the host. FIG. 4 illustrates schematically a flow chart of the multi-path management method. According to FIG. 4, in step S402, LUNs with the same paths between the host and the storage system are grouped into a group of LUNs; and in step S403, one path selection thread is used for all of LUNs in the group of LUNs to manage the same paths. In an embodiment, the method further comprises step S401 of identifying the LUNs with the same paths between the host and the storage system. Step S401 is a preferred embodiment because sometimes the LUNs with the same paths between the host and the storage system have been identified otherwise, for example, when the LUNs are mapped to the host, it has been known directly that which LUNs belong to a specific physical memory and can be grouped directly.

Thus, in the foregoing example, a host originally has 1,000 LUNs mapped thereto and can access the storage system over 6 paths, so multi-path software on the host will management 6,000 paths and use one path management algorithm thread per LUN, totaling to 6,000 path management algorithm threads as required. With the method of the invention, LUNs 1-500 from a storage system A have the same storage paths; and LUNs 501-1000 from a storage system B also have the same storage paths, so there are two groups of LUNs at the host side, wherein LUNs 1-500 are grouped into a first group, and LUNs 501-1000 are grouped into a second group. As a result of binding all of LUNs in a group of LUNs on the paths used by all the LUNs in the group, there are 6 paths for the first group LUNs; and there are 6 paths for the second group of LUNs. Since paths are managed centrally per group of LUNs, that is, one path selection thread is used for all of LUNs in the group of LUNs to manage the same paths, only one path management algorithm thread needs to be used in the first group to manage these 6 paths, and the path management thread uses these 6 paths for all the LUNs in the first group; when there is an IO to be routed to an LUN in the group, the path management thread selects one available path among the 6 paths. The same applies to the second group, then there are only two path management algorithm threads at the host side, and each thread will manage only 6 paths, thus lowering the amount of work for path management and the amount of resources required as compared with the prior art.

In a particular implementation, step S401 of identifying the LUNs with the same paths between the host and the storage system can be implemented variously, for example, the LUNs with the same paths can be identified directly by the host, or the LUNs with the same paths can be identified by other devices coupled with the host. A most basic embodiment will be introduced below.

Figure 5:
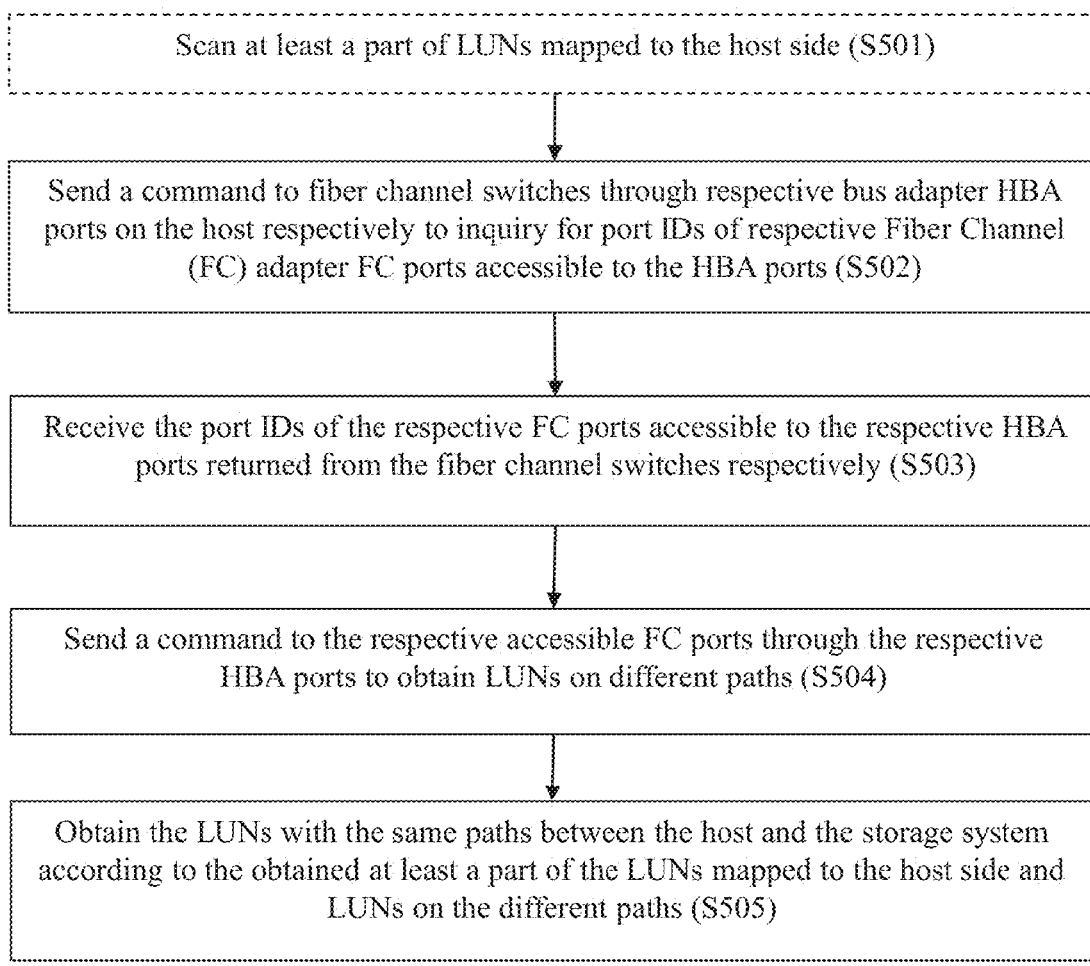
FIG. 5 illustrates a particular flow of an embodiment of identifying LUNs with the same paths between a host and a storage system.

FIG. 5 illustrates a particular flow of an embodiment of identifying LUNs with the same paths between a host and a storage system. According to FIG. 5, in step S501, at least some of LUNs mapped to the host side are scanned. This step can be triggered by a command (e.g., a cfgmgr command of an AIX operating system) or can be triggered by a periodical operating command or be triggered by restarting the host. In step S502, a command is sent to fiber channel switches respectively through respective bus adapter HBA ports on the host to inquiry for port IDs of respective Fiber Channel (FC) adapter FC ports of the storage system accessible to the HBA ports. In step S503, the port IDs of the respective FC ports accessible to the respective HBA ports returned from the fiber channel switches are received respectively. If the respective HBA ports have established connections with the respective FC ports corresponding to the returned port IDs, in step S504, a command is sent to the respective accessible FC ports through the respective HBA ports to identify LUNs on different paths, wherein there is a path of an LUN from a specific HBA port ID to a specific FC port ID. In this embodiment, if an HBA port has not established a connection with an FC port corresponding to a returned port ID, a connection needs to be established through a PLOGI/PRLI command in the SCSI protocol at first. The SCSI commands sent are INQUIRY and REPORT LUNS. In step S505, the LUNs with the same paths between the host and the storage system are identified according to the identified at least some of the LUNs mapped to the host side and LUNs on the different paths. Since the same LUN will be reported from all the FC ports of the storage system and HBA ports of the host side between which connections are established (that is, reported over all the multiple available paths), simply, which FC ports of the storage side reporting the same LUN to which HBA ports of the host side are recorded, that is, the report paths of the LUN are recorded, and then the report paths are compared between the respective reported LUNs to thereby know which LUNs have the same paths.

In another embodiment, some storage system has such a function that when an LUN is mapped to a host, this LUN is specified to be accessible through a specific FC port of the storage side. For a storage not supporting this function, multiple paths from the host to the storage are also multiple paths over which the host can access an LUN on the storage, which also means that the host accesses an LUN from the same storage over the same paths. For a storage supporting this function, the host also accesses an LUN from the same storage over the same paths as long as this function is disabled. Given this condition satisfied, whether LUNs have the same paths from the host can be determined simply by determining whether the LUNs are from the same storage, because the LUNs from the same storage have the same paths.

After identifying the LUNs with the same paths between the host and the storage system, step S402 can be performed to group the LUNs with the same paths between the host and the storage system into a group of LUNs, and one path selection thread is used for all of LUNs in the group of LUNs to manage the same paths.

A path selection algorithm can be any of existing path selection algorithms, and the same path selection algorithm can be used for different groups of LUNs or different path selection algorithms can be used for different groups of LUNs. For example, the Failover algorithm is used for a specific group of LUNs, wherein only one path is selected to route an IO, and another path will be selected to route the IO only if that path fails. Then given an available path selected for all the LUNs in the group, an IO is routed over one path, and another path will be selected to route the IO only if that path fails, so that all the LUNs in the group are switched to the other path. Moreover, paths can be selected by using the Round Robin and Load Balance algorithms.

In the process of managing multiple paths in a path selection algorithm thread, in an embodiment, for each path, a path state of the path needs to be maintained. There are three possible path states, one is Available, that is, the path does not fail and can have an IO routed; another is Fail, that is, the path fails and cannot have any IO routed; and the other is Partly Fail, that is, the path cannot have an IO routed for some of LUNs. They can be represented by different parameters or in other forms, for example, "0" represents an Available path, "2" represents a Partly Fail path, etc. The path state is Available Path by default.

Figure 6:
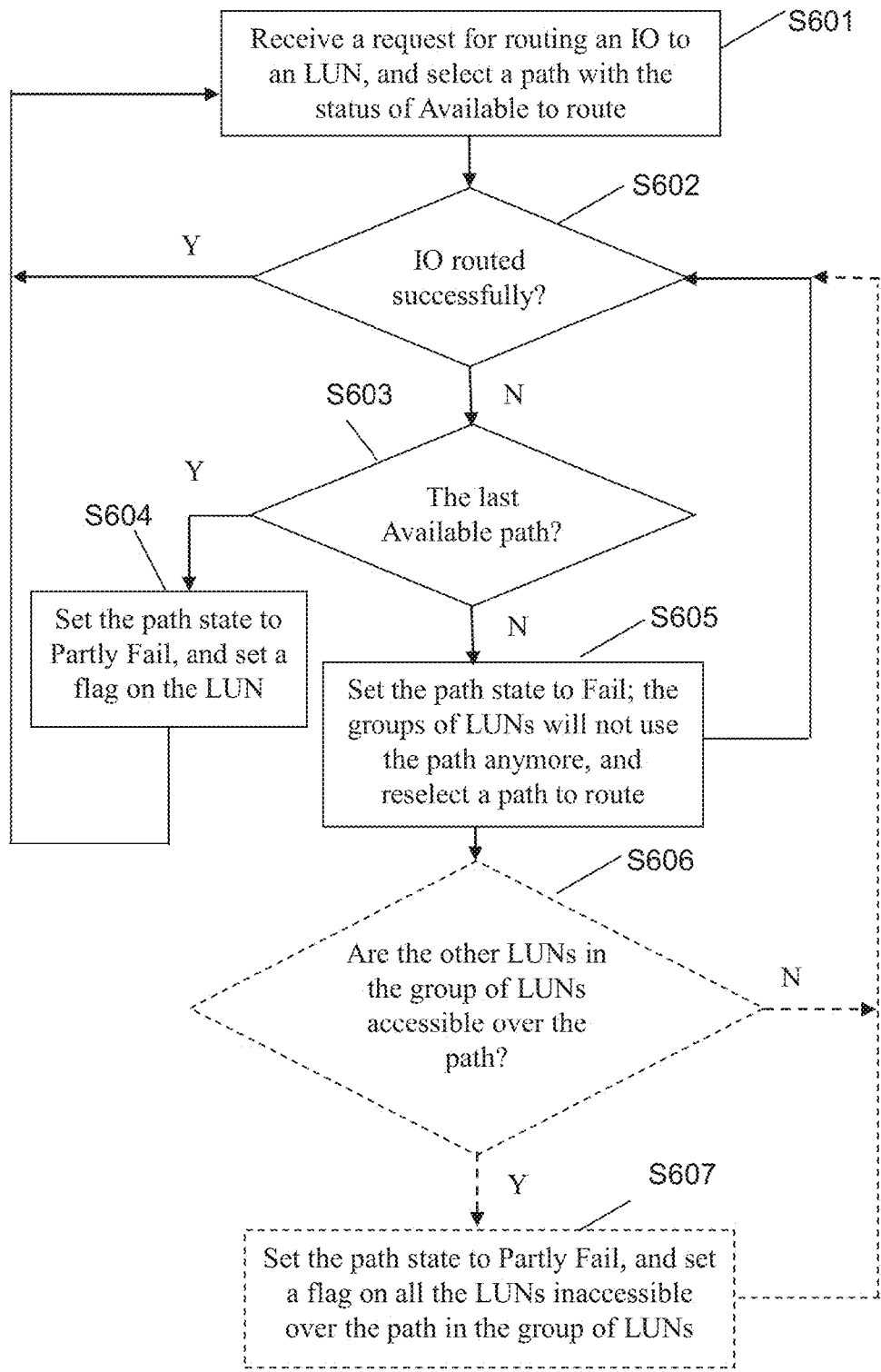
FIG. 6 illustrates a flow of a particular embodiment of using a path selection algorithm.

For the host, FIG. 6 illustrates a flow of a particular embodiment of the path selection algorithm. According to FIG. 6, in step S601, a request for routing an IO to an LUN is received, a path selection thread used for a group of LUNs which the LUN belongs to selects one path with a path status of Available or Partly Fail among the same paths, and the IO is routed to the LUN over the selected path. In step S602, it is determined whether the IO is routed successfully, if the IO is routed successfully, the path state of the path is kept unchanged, that is, the path continues to be available, and the flow returns to step S601 wherein a request for routing an IO is further received. If the IO is routed unsuccessfully, in step S603, it is determined whether the path is the last path with a path state of Available for the group of LUNs which the LUN belongs to. If the path is the last path with a path state of Available for the group of LUNs which the LUN belongs to, in step S604, the state of the path on the group of LUNs is set to Partly Fail instead of Fail (otherwise there is no available path throughout the group of LUNs), and also a flag is set on the LUN to indicate that the LUN cannot have the IO routed over the path. At this time, this IO cannot be routed to the corresponding LUN, and the host will receive an error reported from the system. Then the flow returns to step S601 wherein a request for routing an IO is further received. If the path is not the last path with a path state of Available for the group of LUNs which the LUN belongs to, in step S605, the path state of the path on the group of LUNs is set to Fail, so that all the LUNs in the group of LUN will not have any IO routed over the path, and the path selection thread used for the group of LUNs which the LUN belongs to reselects another available path among the same paths, and the flow returns to step S602 wherein it is further determined whether the IO is routed successfully after the IO is routed over the newly selected path.

In a preferred embodiment, after the path state of a specific path on the group of LUNs is set to Fail in step S605, the flow proceeds to step S606 wherein it is checked whether other LUNs in the group of LUNs is accessible over the failed path. If none of the other LUNs in the group of LUNs is accessible over the failed path, the Fail state of the path on the group of LUN is kept, and the flow returns to step S602 wherein it is further determined whether the IO is routed successfully after the IO is routed over the newly selected path. Typically, this situation is very common because a path failure generally results from a failure of an HBA port of the host side, a failure of a PC port of the storage side, a failure of an fiber channel switch port or a failure of a fiber channel line connection between the respective ports, and consequently in the case of the path failures resulting from these failures, none of LUNs in a specific group of LUNs can have an IO routed over the path. However, if some of the other LUNs in the group of LUNs are accessible over the failed path, in step S607, the path state of the path on the group of LUNs is set to Partly Fail, and a flag is set on all the LUNs inaccessible over the path in the group of LUNs to indicate that these LUNs cannot have any IO routed over the path. Also, this situation is very rare and will occur only if some LUNs in a storage itself are accessible but some are inaccessible. At this time, the storage itself has been subjected to a significant failure, but the present multi-path management method can well deal with this failure by preventing the failure from influencing the other normally accessible LUNs, and then the flow returns to step S602 wherein it is further determined whether the IO is routed successfully after the IO is routed over the newly selected path. In a particular check implementation, an INQUIRY command in the SCIS protocol can be sent to the LUN over the path; or a MODE SENSE command in the SCIS protocol can be sent to the LUN over the path.

Two implementations of setting a flag on an LUN will be given below:

1. A pointer defaulted as NULL can be defined in a data structure of each LUN in the group of LUNs. When a flag needs to be set on an LUN to indicate that a specific path is unavailable, a memory of one byte (8 bits, which can represent the states of 8 paths) is allocated temporarily and assigned (for example, 00000001, which represents a first path on the group of LUNs is unavailable, and 00001001 represents a first and a fourth paths on the group of LUNs are unavailable, etc.), and then the pointer mentioned above is pointed to the space of the memory. Thus, the pointer plays the role of a flag. If there are a large number of paths on the groups of LUNs, then a memory of two bytes or three bytes can be allocated to represent the paths.

2. One byte defaulted as 0 can be defined in a data structure of each LUN in the group of LUNs (8 bits, which can represent the states of 8 paths. If there are a large number of paths on the groups of LUNs, two bytes or three bytes can be defined). When a flag needs to be set on an LUN to indicate that a specific path is unavailable, this byte is assigned, for example, 00000001, which represents a first path on the group of LUNs is unavailable, and 00001001 represents a first and a fourth paths on the group of LUNs is unavailable, etc. Thus this byte plays the role of a flag.

The foregoing method can select an available path to route an IO and also discover a failed path, that is, a path with a path state of Fail or Partly Fail. The failed path needs to be reclaimed after the being debugged. Thus, in a preferred embodiment, if there is a failed path in a specific group of LUNs, it can be checked aperiodically or periodically whether all the LUNs in the group of LUNs are accessible by reusing the path. Here, the period of the periodical check can be user-configured, for example, once per minute, once per half of a minute, etc. Regarding a method for check, an INQUIRY command in the SCIS protocol can be sent to the LUNs over the path; or a MODE SENSE command in the SCIS protocol can be sent to the LUNs over the path. If all the LUNs in the group of LUNs are accessible over the path, the path state of the path on the group of LUNs is set to Available, and if the original path state is Partly Fail, the flag on the LUNs which indicates the path is unavailable will also be removed; and if some of the LUNs are accessible and some of the LUNs are inaccessible (this situation is very rare), the path state of the path on the group of LUNs is set to Partly Fail, and a flag is set on those inaccessible LUNs in the group of LUNs to indicate that these LUNs cannot have any IO routed over the path; and if none of the LUNs in the group of LUNs is accessible over the path, an aperiodical or periodical check is continued. Thus, the state of the failed path is resumed to Available after the path is recovered, thereby further lowering an IO delay.

In the prior art, multi-path software handles multiple paths on each LUN separately. When an IO is routed unsuccessfully over a specific path of a specific LUN, the state of the path is set to Fail; and if there are the same paths on other LUNs as well, these paths are still in an Available state. However, in most cases, the same paths on these LUNs actually failed and cannot have any IO routed, but the multi-path software is unaware of this and will have the IO routed over these paths actually failed but still in an Available state, resulting in a larger number of failures in IO routing and consequently a larger IO delay and a higher system overhead. With the multi-path management method in this invention, the foregoing problems can be well obviated. When an IO is routed unsuccessfully over a specific path of a specific LUN, the state of the path on the group of LUNs is set to a Fail state (as long as the path is not the last path with a path state of Available in the group of LUNs), and all the LUNs in the group of LUNs will not use the path anymore.

Figure 7:
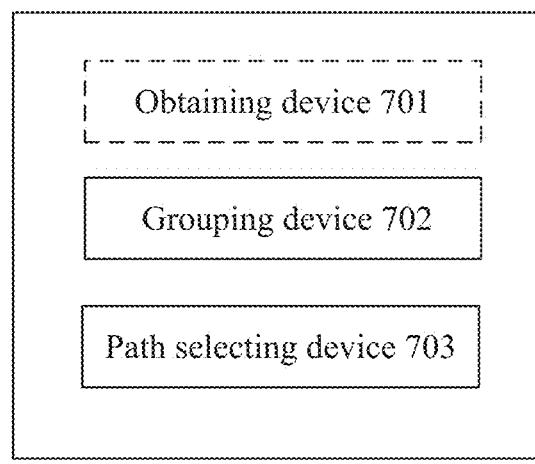
FIG. 7 illustrates a structural block diagram of a multi-path management system.

With the same inventive idea, an embodiment of the invention further discloses a multi-path management system for managing paths over which an IO is routed from a host to multiple logical volumes (LUNs) of a storage system, wherein the multiple LUNs of the storage system are mapped to the host. FIG. 7 illustrates a structural block diagram of a multi-path management system. According to FIG. 7, the system includes: a grouping device 702, configured to Group LUNs with the same paths between the host and the storage system into a group of LUNs; and a path selecting device 703, configured to use one path selection thread for all of LUNs in the group of LUNs to manage the same paths. In a preferred embodiment, the system further includes: an identifying device 701, configured to identify the LUNs with the same paths between the host and the storage system.

In a preferred embodiment, the identifying device includes: a scanning device, configured to scan at least some of LUNs mapped to the host side; an inquiring device, configured to send a command to fiber channel switches through respective bus adapter HBA ports on the host respectively, to inquiry for port IDs of respective Fiber Channel (FC) adapter FC ports of the storage system accessible to the HBA ports; a receiving device, configured to receive the port IDs of the respective FC ports accessible to the respective HBA ports returned from the fiber channel switches respectively; an LUN on different path identifying device, configured to send a command to the respective accessible FC ports through the respective HBA ports to identify LUNs on different paths if the respective HBA ports have established connections with the respective FC ports corresponding to the returned port IDs, wherein a path of an LUN is from a specific HBA port ID to a specific FC port ID; and an LUN on the same path identifying device, configured to identify the LUNs with the same paths between the host and the storage system according to the identified at least some of the LUNs mapped to the host side and LUNs on the different paths.

In another embodiment, the path selecting device includes: a state maintaining device, configured to maintain for each path a path state of the path, wherein there are three path states: Available, indicating that the path does not fail and can have an IO routed; Fail, indicating that the path failed and cannot have any IO routed; and Partly Fail, indicating that the path can have an IO routed for some of the LUNs.

In still another embodiment, the path selecting device is further configured to: receive a request for routing an IO to an LUN; select a path with a path status of Available or Partly Fail among the same paths by a path selection thread used for a group of LUNs which the LUN belongs to; and route the IO to the LUN over the selected path. In a further embodiment, the path selecting device is further configured to: determine whether the IO is routed successfully after routing the IO to the LUN over the selected path; if the IO is routed unsuccessfully, further determine whether the path is the last path with a path state of Available for the group of LUNs which the LUN belongs to; and if the path is the last path with a path state of Available for the group of LUNs which the LUN belongs to, set the state of the path on the group of LUNs to Partly Fail, and set a flag on the LUN to indicate that the LUN cannot have the IO routed over the path. The path selecting device is further configured to: set the path state of the path on the group of LUNs to Fail, so that all the LUNs in the group of LUN will not have any IO routed over the path; if it is determined that the path is not the last path with a path state of Available for the group of LUNs which the LUN belongs to, reselect another available path among the same paths by the path selection thread used for the group of LUNs which the LUN belongs to.

In a still further embodiment, the route selecting device configured to set the path state of the path on the group of LUNs to Fail is further configured to: check whether other LUNs in the group of LUNs is accessible over the failed path; if none of the other LUNs in the group of LUNs is accessible over the failed path, keep the state of the path on the group of LUN as Fail; and if some of the other LUNs in the group of LUNs are accessible over the failed path, set the path state of the path on the group of LUNs to Partly Fail, and set a flag on all the LUNs inaccessible over the path in the group of LUNs to indicate that these LUNs cannot have any IO routed over the path.

In a further embodiment, the system further includes a path recovering device configured to: for a path in a path state of Path Fails or Path Partly Fails check whether all the LUNs in the group of LUNs are accessible by reusing the path; if all the LUNs in the group of LUNs are accessible over the path, set the path state of the path on the groups of LUNs to Available; if the original path state is Partly Fail, remove the flag on the LUNs which indicates the path is unavailable; if some of the LUNs are accessible and some of the LUNs are inaccessible, set the path state of the path on the group of LUNs to Partly Fail, and set a flag on those inaccessible LUNs in the group of LUNs to indicate that these LUNs cannot have any IO routed over the path; and if none of the LUNs in the group of LUNs is accessible over the path, continue with a check.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A multi-path management method of managing paths over which an IO is routed from a host to multiple logical volumes (LUNs) of a storage system, wherein the multiple LUNs of the storage system are mapped to the host, the method comprising:
grouping LUNs with the same paths between the host and the storage system into a group of LUNs;
using one path selection thread for all LUNs in the group of LUNs to manage the same paths and;
identifying LUNs with the same paths between the host and the storage system by scanning at least some of the LUNs mapped to the host side, the identifying comprising:
sending a command to fiber channel switches through respective bus adapter HBA ports on the host respectively, to inquiry for port IDs of respective Fiber Channel (FC) adapter FC ports of the storage system accessible to the HBA ports;
receiving the port IDs of the respective FC ports accessible to the respective HBA ports returned from the fiber channel switches respectively;
sending a command to the respective accessible FC ports through the respective HBA ports to identify LUNs on different paths, if the respective HBA ports have established connections with the respective FC ports corresponding to the returned port IDs, wherein a path of an LUN is from a specific HBA port ID to a specific FC port ID; and
identifying the LUNs with the same paths between the host and the storage system according to the identified at least some of the LUNs mapped to the host side and LUNs on the different paths.

2. The method according to claim 1, wherein using one path selection thread for all LUNs in the group of LUNs to manage the same paths comprises:
maintaining for each path a path state of the path, wherein a path state is one of: available, indicating that the path does not fail and can have an IO routed; fail, indicating that the path fails and cannot have any IO routed; and partly fail, indicating that the path can have an IO routed for some of the LUNs.

3. The method according to claim 2, wherein using one path selection thread for all LUNs in a group of LUNs to manage the same paths comprises:
receiving a request for routing an IO to an LUN;
selecting a path with a path status of available or partly fail among the same paths by a path selection thread used for a group of LUNs which the LUN belongs to; and
routing the IO to the LUN over the selected path.

4. The method according to claim 3, further comprising:
determining whether the IO is routed successfully;
if the IO is routed unsuccessfully:
determining whether the path is a last path with a path state of available for the group of LUNs which the LUN belongs to;
if the path is the last path with a path state of available for the group of LUNs which the LUN belongs to:
setting the state of the path on the group of LUNs to Partly Fail; and
setting a flag on the LUN to indicate that the LUN cannot have the IO routed over the path.

5. The method according to claim 4, wherein if the IO is routed unsuccessfully further comprises:
if the path is not the last path with a path state of available for the group of LUNs which the LUN belongs to:
setting the path state of the path on the group of LUNs to Fail, so that all the LUNs in the group of LUN will not have any IO routed over the path; and
reselecting another available path among the same paths by the path selection thread used for the group of LUNs which the LUN belongs to.

6. The method according to claim 5, wherein setting the path state of the path on the group of LUNs to fail further comprises:

determining whether other LUNs in the group of LUNs is accessible over the failed path;
if none of the other LUNs in the group of LUNs is accessible over the failed path:
keeping the state of the path on the group of LUN as Fail;
if some of the other LUNs in the group of LUNs are accessible over the failed path:
setting the path state of the path on the group of LUNs to Partly Fail; and
setting a flag on all the LUNs inaccessible over the path in the group of LUNs to indicate that these LUNs cannot have any IO routed over the path.

7. The method according to claim 2, wherein the method further comprises:
determining for a path in a path state of path fails or path partly fails whether all the LUNs in the group of LUNs are accessible by reusing the path;
if all the LUNs in the group of LUNs are accessible over the path:
setting the path state of the path on the groups of LUNs to available; and
if the original path state is Partly Fail, removing the flag on the LUNs which indicates the path is unavailable;
if some of the LUNs are accessible and some of the LUNs are inaccessible: setting the path state of the path on the group of LUNs to Partly Fail; and setting a flag on those inaccessible LUNs in the group of LUNs to indicate that
these LUNs cannot have any IO routed over the path; and
if none of the LUNs in the group of LUNs is accessible over the path: continuing with a check.

8. A multi-path management system to manage paths over which an IO is routed from a host to multiple logical volumes (LUNs) of a storage system, wherein the multiple LUNs of the storage system are mapped to the host, comprising:
a grouping device, configured to group LUNs with the same paths between the host and the storage system into a group of LUNs;
a path selecting device, configured to use one path selection thread for all LUNs in a group of LUNs to manage the same paths; and
an identifying device, configured to identify the LUNs with the same paths between the host and the storage system, wherein the identifying device further comprises:
an inquiring device, configured to send a command to fiber channel switches through respective bus adapter HBA ports on the host respectively, to inquire for port IDs of respective Fiber Channel (FC) adapter FC ports of the storage system accessible to the HBA ports;
a receiving device, configured to receive the port IDs of the respective FC ports accessible to the respective HBA ports returned from the fiber channel switches respectively;
an LUN on different path identifying device, configured to send a command to the respective accessible FC ports through the respective HBA ports to identify LUNs on different paths, if the respective HBA ports have established connections with the respective FC ports corresponding to the returned port IDs, wherein a path of an LUN is from a specific HBA port ID to a specific FC port ID; and
an LUN on the same path identifying device, configured to identify the LUNs with the same paths between the host and the storage system according to
the identified at least some of the LUNs mapped to the host side and LUNs on the different paths,
wherein the identifying device comprises a scanning device, configured to scan at least some of the LUNs mapped to the host side.

9. The system according to claim 8, wherein the system further comprises a path recovering device configured to:
determine for a path in a path state of path fails or path partly fails whether all the LUNs in the group of LUNs are accessible by reusing the path;
if all the LUNs in the group of LUNs are accessible over the path:
set the path state of the path on the groups of LUNs to available; and
if the original path state is Partly Fail, remove the flag on the LUNs which indicates the path is unavailable;
if some of the LUNs are accessible and some of the LUNs are inaccessible:
set the path state of the path on the group of LUNs to Partly Fail, and set a flag on those inaccessible LUNs in the group of LUNs to indicate that these LUNs cannot have any IO routed over the path; and
if none of the LUNs in the group of LUNs is accessible over the path, continue with a check.

10. The system according to claim 8, wherein the path selecting device comprises a state maintaining device configured to maintain for each path a path state of the path, wherein a path state is one of: available, indicating that the path does not fail and can have an IO routed; fail, indicating that the path fails and cannot have any IO routed; and partly fail, indicating that the path can have an IO routed for some of the LUNs.

11. The system according to claim 10, wherein the path selecting device is further configured to:
receive a request for routing an IO to an LUN;
select a path with a path status of Available or Partly Fail among the same paths by a path selection thread used for a group of LUNs which the LUN belongs to; and
route the IO to the LUN over the selected path.

12. The system according to claim 11, wherein the path selecting device is further configured to:
determine whether the IO is routed successfully;
if the IO is routed unsuccessfully:
determine whether the path is a last path with a path state of Available for the group of LUNs which the LUN belongs to;
if the path is the last path with a path state of Available for the group of LUNs which the LUN belongs to:
set the state of the path on the group of LUNs to Partly Fail, and
set a flag on the LUN to indicate that the LUN cannot have the IO routed over the path.

13. The system according to claim 12, wherein if the IO is routed unsuccessfully further comprises:
if the path is not the last path with a path state of available for the group of LUNs which the LUN belongs to, the path selecting device is further configured to:
set the path state of the path on the group of LUNs to Fail, so that all the LUNs in the group of LUN will not have any IO routed over the path; and
reselect another available path among the same paths by the path selection thread used for the group of LUNs which the LUN belongs to.

14. The system according to claim 13, wherein the route selecting device configured to set the path state of the path on the group of LUNs to Fail is further configured to:

determine whether other LUNs in the group of LUNs is accessible over the failed path;
if none of the other LUNs in the group of LUNs is accessible over the failed path:
keep the state of the path on the group of LUN as fail;
if some of the other LUNs in the group of LUNs are accessible over the failed path:
set the path state of the path on the group of LUNs to Partly Fail; and
set a flag on all the LUNs inaccessible over the path in the group of LUNs to indicate that these LUNs cannot have any IO routed over the path.

15. A multi-path management method of managing paths over which an IO is routed from a host to multiple logical volumes (LUNs) of a storage system, wherein the multiple LUNs of the storage system are mapped to the host, the method comprising:
grouping LUNs with the same paths between the host and the storage system into a group of LUNs;
using one path selection thread for all LUNs in the group of LUNs to manage the same paths comprising:
maintaining for each path a path state of the path, wherein the path state is one of: available, indicating that the path does not fail and can have an IO routed; fail, indicating that the path fails and cannot have any IO routed; and partly fail, indicating that the path can have an IO routed for some of the LUNs;
receiving a request for routing an IO to an LUN;
selecting a path with a path status of available or partly fail among the same paths by a path selection thread used for a group of LUNs which the LUN belongs to; and
routing the IO to the LUN over the selected path; and
determining whether the IO is routed successfully;
if the IO is routed unsuccessfully:
determining whether the path is a last path with a path state of available for the group of LUNs which the LUN belongs to;
if the path is the last path with a path state of available for the group of LUNs which the LUN belongs to:
setting the state of the path on the group of LUNs to Partly Fail; and
setting a flag on the LUN to indicate that the LUN cannot have the IO routed over the path.

* * * * *